US005834999A

United States Patent [19]

Kinman

[11] Patent Number: 5,834,999

[45] Date of Patent: Nov. 10, 1998

[54] TRANSDUCER FOR A STRINGED MUSICAL INSTRUMENT

[76] Inventor: Christopher Ian Kinman, Unit 3, 28 Baldock St., Moorooka Queensland, Australia, 4105

[21] Appl. No.: 821,084

[22] Filed: Mar. 20, 1997

Related U.S. Application Data

[63] Continuation-in-part of Ser. No. 616,569, Mar. 15, 1996, Pat. No. 5,668,520.

[30] Foreign Application Priority Data

Sep. 17, 1996 [AU] Australia .................................. PO2364

[51] Int. Cl.[6] .............................. H01F 27/36; G01H 3/14

[52] U.S. Cl. ........................... 336/84 R; 360/124; 84/728

[58] Field of Search .................................. 336/84 R, 110, 336/220, 221; 360/124; 84/725, 726, 728

[56] References Cited

U.S. PATENT DOCUMENTS

| | | | |
|---|---|---|---|
| 3,963,975 | 6/1976 | Gauper, Jr. et al. | 336/84 |
| 3,969,771 | 7/1976 | Suzuki et al. | 360/124 |
| 4,442,749 | 4/1984 | DiMarzio et al. | 84/728 |
| 4,524,667 | 6/1985 | Duncan | 84/728 |
| 5,168,117 | 12/1992 | Anderson | 84/728 |
| 5,464,948 | 11/1995 | Lace | 84/726 |

*Primary Examiner*—Stuart N. Hecker

*Attorney, Agent, or Firm*—Fishman, Dionne, Cantor & Colburn

[57] ABSTRACT

A transducer for a stringed instrument comprises a first uppermost coil, and a second lowermost coil with the axes of the coils coincident. At least one permanent magnet pole piece associated with the coils and a shield of magnetically permeable material arranged between the coils with the shield having one or more walls which extend over sides of the coils.

19 Claims, 10 Drawing Sheets

TRANSDUCER FOR A STRINGED MUSICAL INSTRUMENT

CROSS-REFERENCE TO RELATED APPLICATION

This application is a continuation in part application to U.S. patent application 08/616569 filed 15 Mar. 1996 now U.S. Pat. No. 5,668,520 by Christopher Ian Kinman.

BACKGROUND OF THE INVENTION

This invention relates to transducers or pickups for stringed musical instruments whose output is intended to be amplified. In particular, the invention provides an improved pickup having a high Q factor value.

The invention will be described by way of example with reference to the musical instrument to which the pickups are fitted as being electric guitars. It should be appreciated that this is by way of example only and that instruments other than guitars may also be fitted with pickups according to the invention.

Electric guitars typically have at least four strings which when vibrated produce an output for amplification. The vibration of the strings is converted to electrical signals by pickups. The frequency of the electrical signals produced by the pickups corresponds to the frequency of vibration of the strings.

Pickups typically consist of a single bar magnet within a coil or a plurality of permanent magnets with a coil. The strings of the guitar are made of a magnetically permeable material typically a ferromagnetic material and the magnetic lines of flux developed by the permanent magnets are intercepted by the vibrating strings. This causes variations in the field pattern and a varying current is caused to flow in the coils. The frequency of the current corresponds to the frequency of vibration of the strings.

The coils, as well as being influenced by vibration of the strings also are subjected to noise. Noise is produced by mains wiring, transformers, lighting, electric motors and appliances and other sources. This noise, or hum adversely affects the quality of the sound reproduced by the pickups. The fundamental frequency of the electrical supply voltage, typically 50 Hz or 60 Hz, is converted into an audible hum in the amplifying equipment.

Historical pickups have long strong magnets that attract the oscillating strings downward into a U shaped path which results in strings crashing into the frets of the guitar. This string crash is one element of "vintage sound" and is deliberately sought. Historical single coil pickup design reproduced 50 or 60 Hz noise (hum) as well as the desired "vintage sound".

There is no ready way of producing such a vintage sound with modern electric guitars while still providing for adequate noise cancellation.

BRIEF SUMMARY OF THE INVENTION

It is an object of the present invention to provide an improved transducer for a stringed musical instrument which at least minimises some of the disadvantages above.

According to one aspect of the invention, there is provided a transducer having a first coil, a second coil adjacent the first coil, a metallic shield made of magnetically permeable material arranged between the coils, the shield having one or more outwardly directed walls with the wall or walls of the shield extending over sides of the coils and at least one permanent magnet pole piece associated with the first and the second coil.

The shields are made from magnetically permeable material. The shields may be made from mild steel typically having a thickness of about 0.6 mm. The shields may be in the form of trays having a base and a continuous side wall. Alternatively, the shield may be U-shaped having a base and opposed side walls. Alternatively, instead of two separate adjacent oppositely directed U-shaped shields, one for each coil, a unitary H shaped shield may be used. One coil may be received between the upper side walls of the H sectioned shield and the other coil may be received between the downwardly directed side walls.

The coils may be wound with the same or different gauge wire. Although any suitable number of turns may be used for the coils, it is preferred that there be between 1000 to 7000 turns in each coil. More preferably, each coil has about 5000 turns. The coils need not have the same number of turns. Where it is desired to match the coils they should have the same number of turns and the same wire gauge should be used.

There is at least one permanent magnet pole piece in each of the coils. The pole piece employed may be common to both coils although separate magnetic pole pieces may be employed for each coil. In one embodiment the coils have associated with them a plurality of magnetic pole pieces. The number of pole pieces used corresponds to the number of strings present in the instrument. Where the instrument has six strings then six pole pieces are present in each coil. Sometimes, there are two poles per string. Common pole pieces may extend through both coils. Thus, six pole pieces may be present in the transducer with each pole piece extending through both coils. Alternatively, a first plurality of magnetic pole pieces may be present in one of the coils and a second separate plurality of magnetic pole pieces may be present in the other coil.

Non-metallic plates may be arranged adjacent ends of the pole pieces. These plates may have holes for receiving ends of the pole pieces.

The magnetic pole piece or pieces may be made from ALNICO II or ALNICO V or any other suitable magnetic material.

BRIEF DESCRIPTION OF THE DRAWINGS

Particular preferred embodiments of the invention will now be described by way of example with reference to the drawings in which.

DETAILED DESCRIPTION OF THE INVENTION

Figure 1:
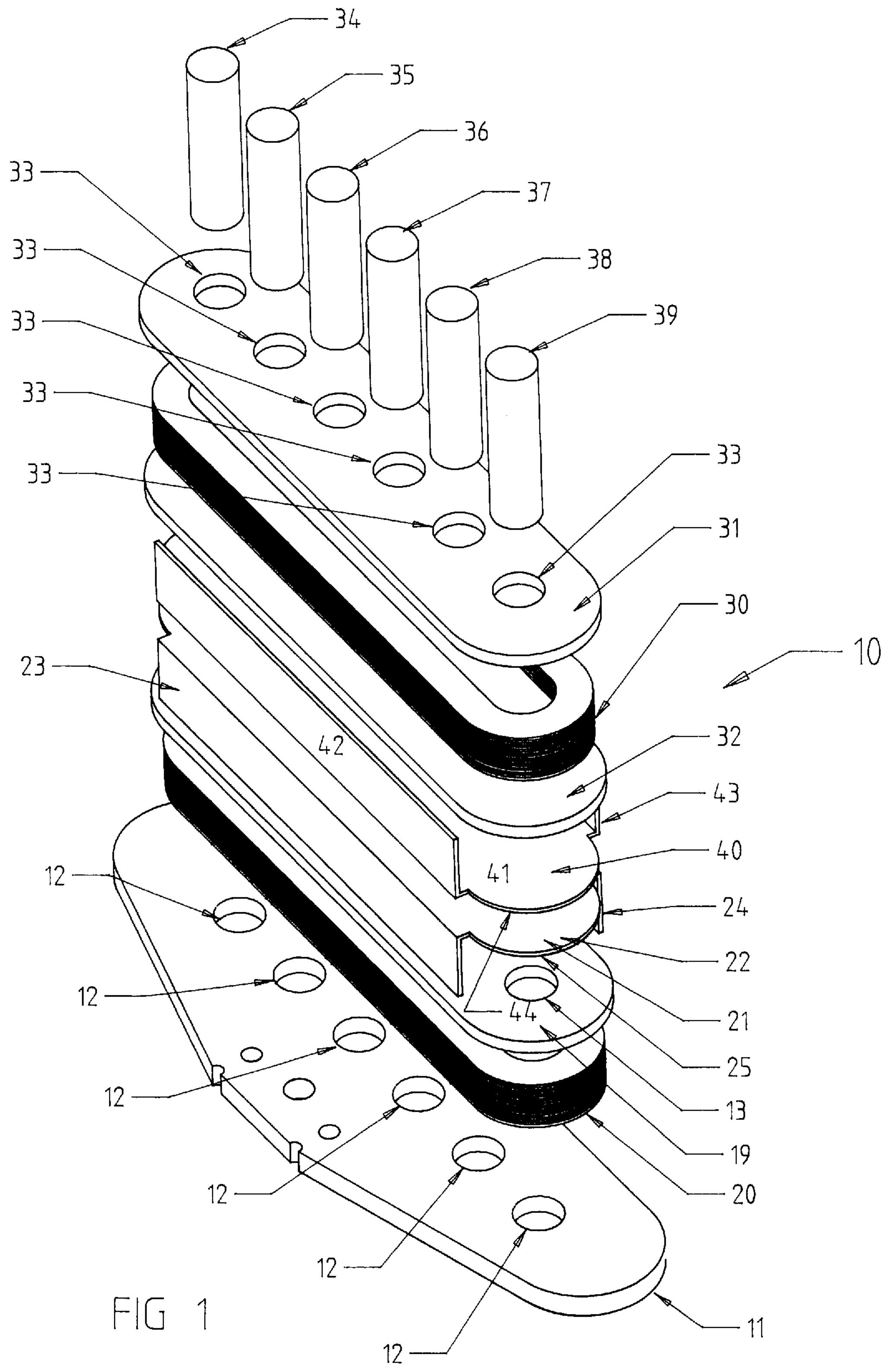
FIG. 1 is an exploded view of a transducer according to an embodiment of the invention.

FIG. 1 shows a transducer 10 having a non-metallic nonconductive base plate 11. Plate 11 has a series of holes 12 for receiving magnetic pole pieces 34, 35, 36, 37, 38 and 39. Plate 19 is constructed of the same material as plate 11. A lower coil 20 extends around pieces 34 to 39 and is located between plates 11 and 19. Shield 21 has a web 22 and two opposed downwardly directed walls 23, 24. These walls extend over sides of the coil 20. Web 22 has rounded ends 25 (only one of which is visible in this view) . Walls 23 and 24 terminate half way across the outermost pole pieces 34 and 39 although they may extend beyond them if desired.

An upper coil 30 is arranged between plates 31 and 32. These plates are constructed of the same material as plates 11 and 19. Plates 31 and 32 have holes 33 for receiving the magnetic pole pieces 34, 35, 36, 37, 38 &, 39. A shield 40 having a web 41 and opposed walls 42, 43 together with shield 21 magnetically separate coil 30 from coil 20. Web 41 overlies and abuts against web 22. Walls 42, 43 extend upwardly and over sides of the coil 30. Web 41 has rounded ends 44 (only one of which is visible in this view) . Walls 42, 43 terminate midway over the outermost pole pieces 34 and 39. Plate 19 has a series of holes 13 through which the pole pieces 34 to 39 extend. Plate 32 has similar holes (not visible in this view).

Figure 2:
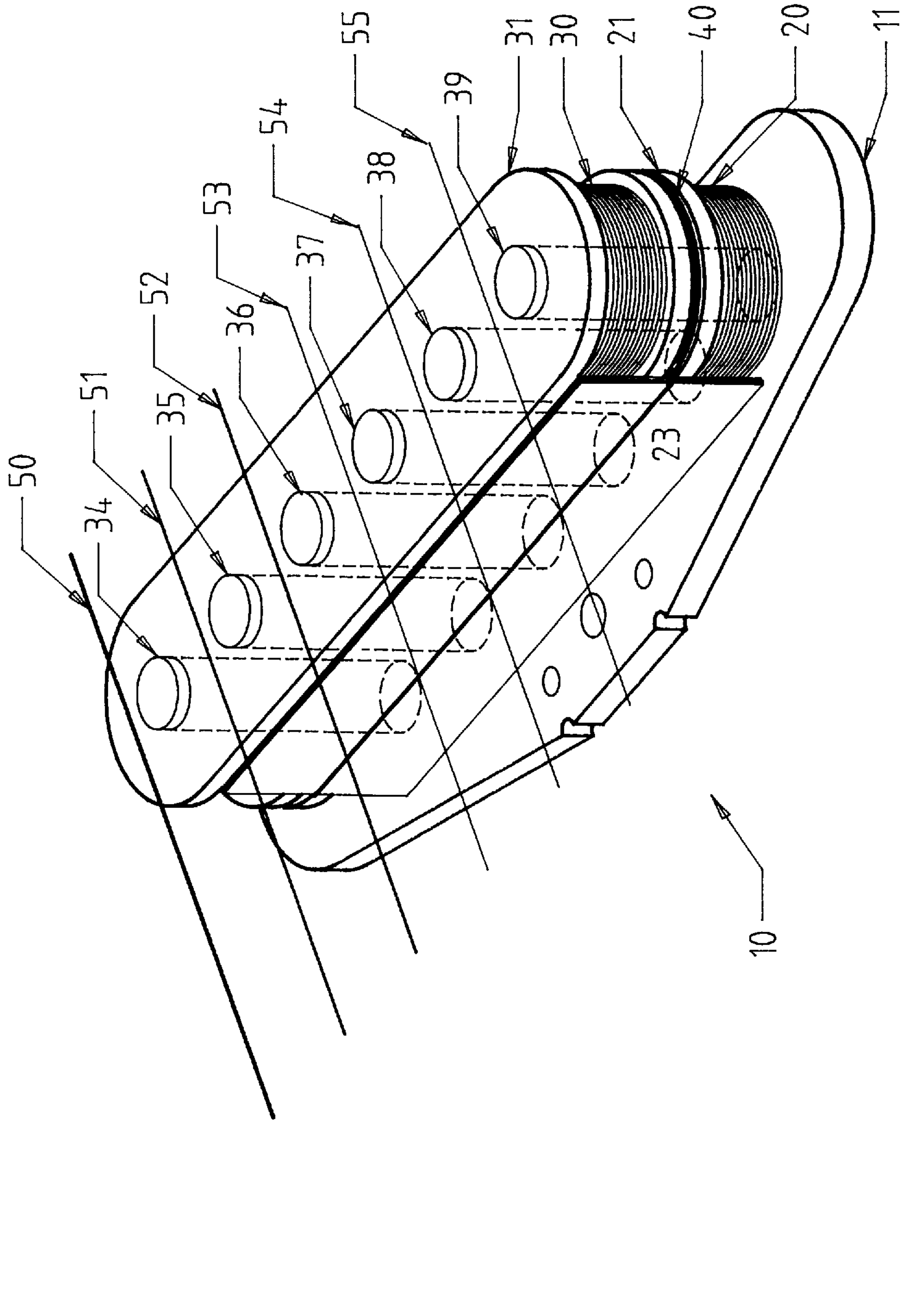
FIG. 2 is an assembled perspective view of the transducer of FIG. 1.

FIG. 2 shows an assembled perspective view of the transducer 10. The orientation assumed by strings 50, 51, 52, 53, 54, 55 relative to transducer 10 is shown. Coil 30 is shown closest to the strings while coil 20 is lowermost with the coils being coaxial with one another. The U shaped shields 21 and 40 divide the magnetic field into two sections, namely, a part within the coils and a part outside the shield. The outside field is uninterrupted from one end of the pole pieces to the other without inductive interaction between the coils because the outside field has no effect on the inner field. The inner fields are confined to the coils in those fields. The coils are magnetically isolated.

Figure 3:
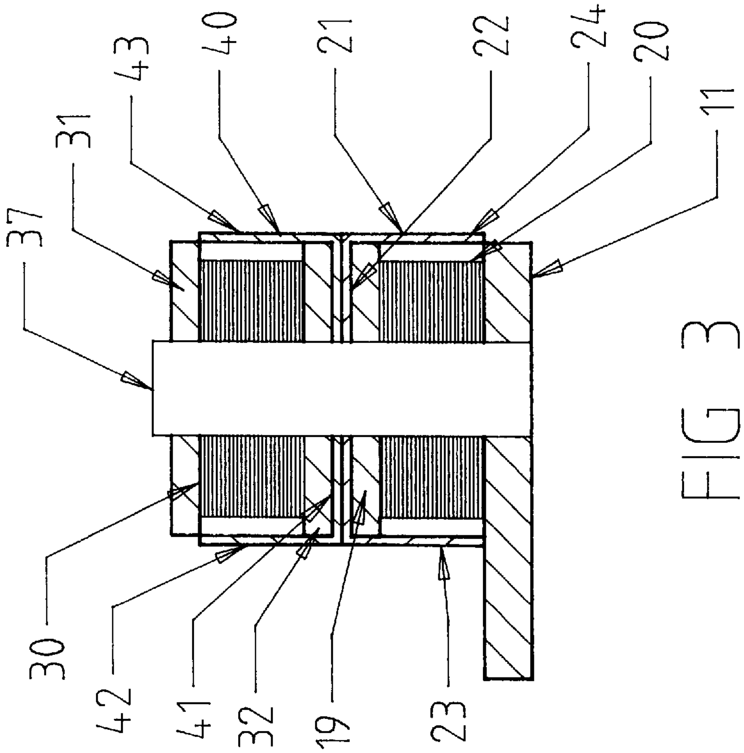
FIG. 3 is a transverse sectional view of the transducer of FIG. 2.

FIG. 3 is a transverse sectional view of the transducer 10 shown in FIG. 2. The shields 21 and 40 are shown surrounding the respective coils on three sides. The walls 23 and 24 of shield 21 extend downwardly over sides of lower coil 20 while walls 42 and 43 of shield 40 extend upwardly over the sides of coil 30.

Magnetic pole piece 37 is held between plates 31 and 11. Webs 22 and 41 separate the coils from one another. Magnetic pole piece 37 extends beyond plate 31. So do the other magnetic pole pieces.

Figure 4:
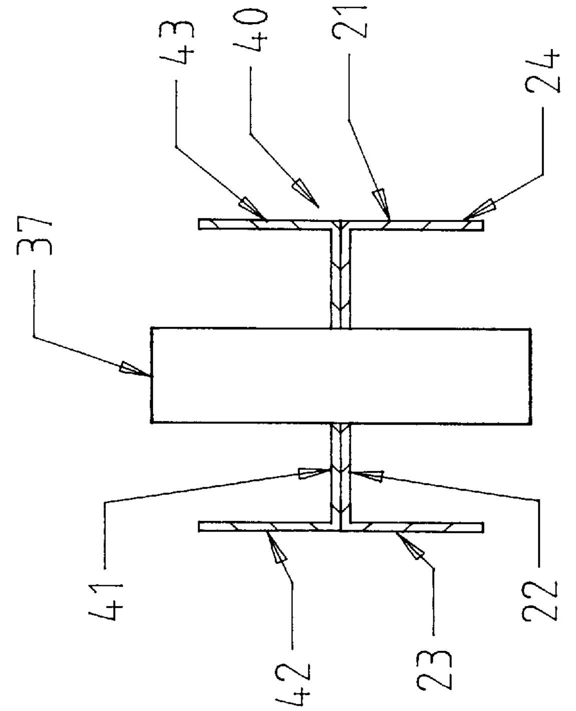
FIG. 4 is a transverse sectional view of part of the transducer of FIG. 3.

FIG. 4 shows a transverse sectional view through the shields 21 and 40 with only the permanent magnet pole piece 37 shown. These shields may be made as a unitary H shaped shield.

Figure 5:
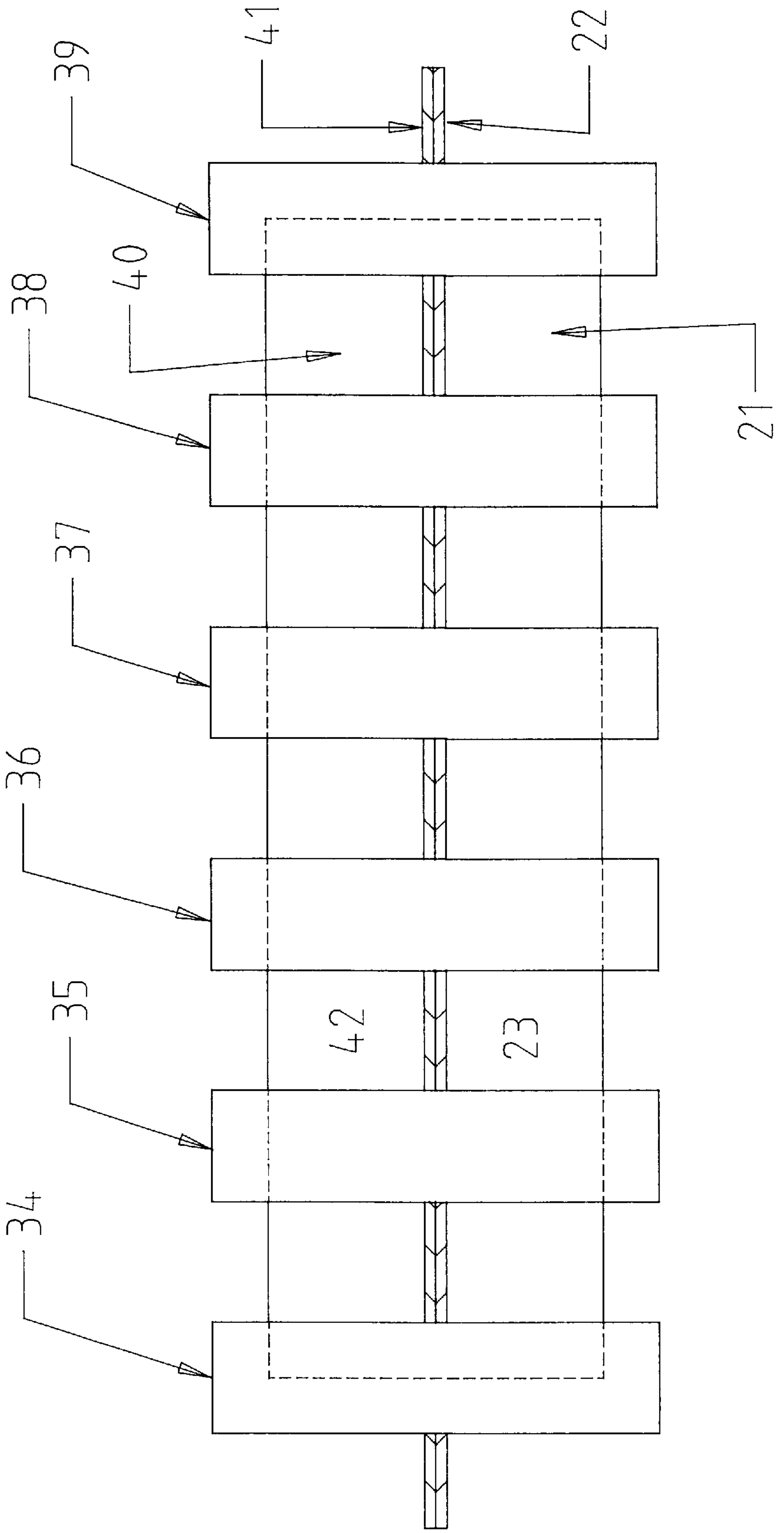
FIG. 5 is a sectional elevational view of that part of the transducer shown in FIG. 4.

FIG. 5 is a front elevational sectional view of that part of the transducer shown in FIG. 4. The shield 40 has a web 41 and upwardly extending walls 42, 43 which terminate halfway over outermost permanent magnet pole pieces 34, 39. Shield 21 has a web 22 and walls 23, 24 which extend downwardly over the pole pieces 34 to 39 and halfway over pieces 34 and 39.

Figure 6:
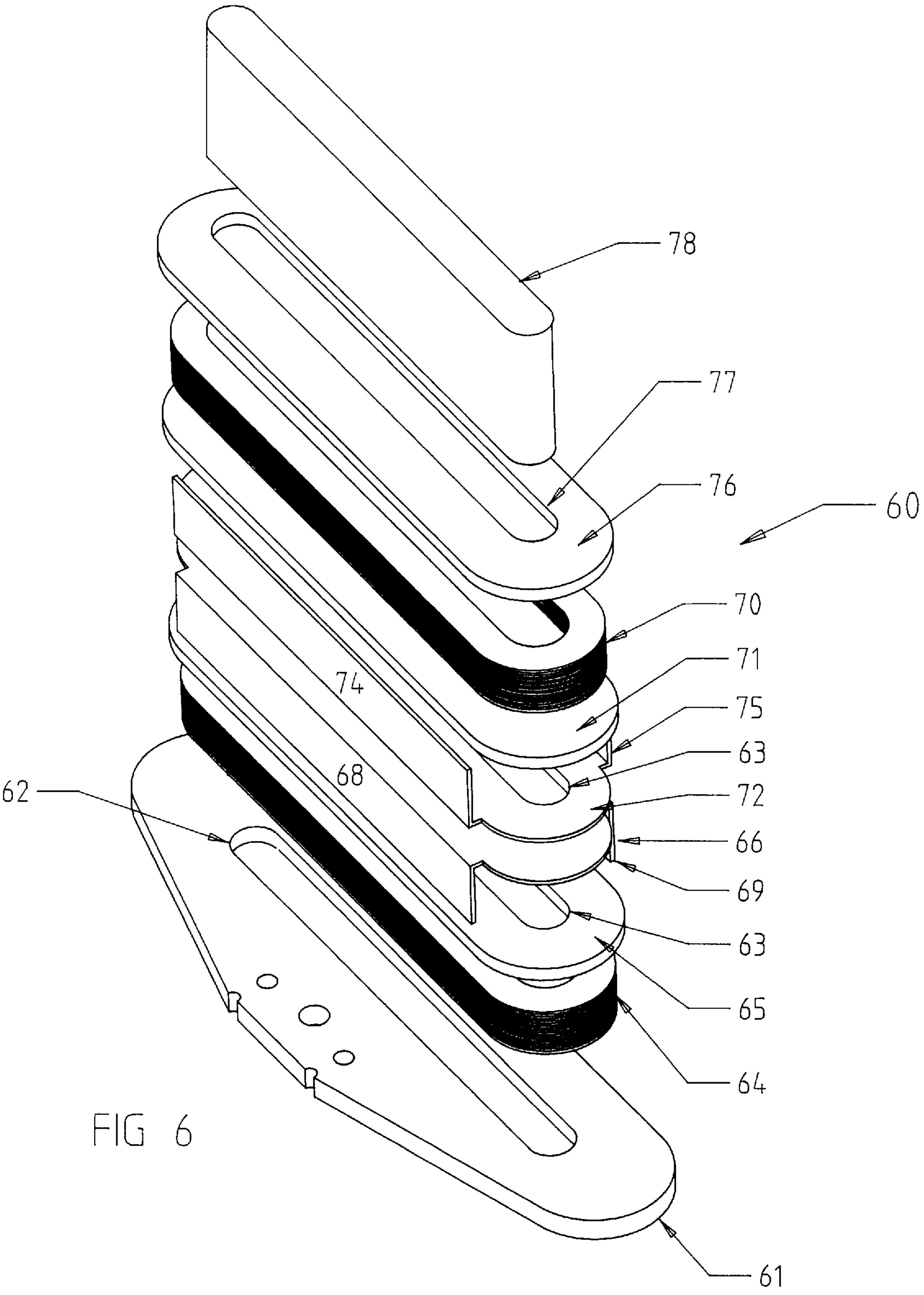
FIG. 6 is an exploded perspective view of an alternative embodiment of a transducer according to the invention.

FIG. 6 shows an exploded perspective view of another transducer according to an embodiment of the invention. The transducer 60 has a base plate 61 constructed of a non-metallic material. Plate 61 has a slot 62 which receives a permanent magnet pole piece 78. A lower coil 64 locates about piece 78 and a plate 65 is positioned over the coil 64. A shield 66 extends over the coil 64 and has a web 67 with two opposed walls 68, 69. Walls 68, 69 extend over sides of the coil 64.

An upper coil 70 is present and rests upon lower plate 71. The coil 70 is received within shield 72. Shield 72 has a base 73 and opposed walls 74, 75 which extend over sides of the coil 70. A plate 76 extends over coil 70 and has a slot 77 for receiving the permanent magnet pole piece 78. The plates 65 and 71 have slots 63 through which pole piece 78 extends. Although not visible in this view, shield 69 has a slot corresponding to slot 63 to allow pole piece 78 to extend between plates 78 and 61.

In this embodiment, coil 70 has a single magnetic pole piece.

Figure 7:
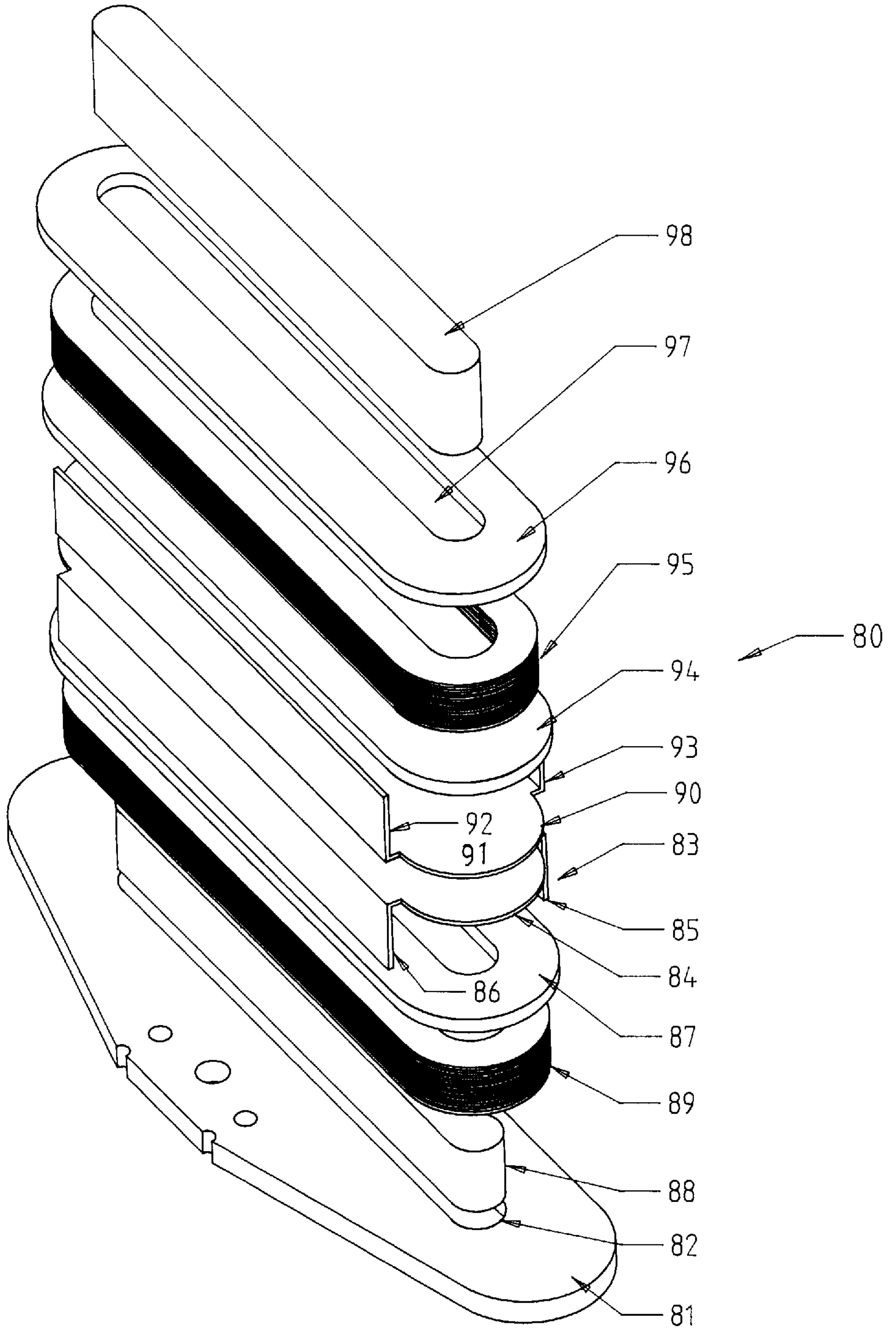
FIG. 7 is an exploded perspective view of a transducer according to another embodiment of the invention.

FIG. 7 is an exploded perspective view of a transducer 80. The transducer 80 has a non-metallic base plate 81 with a slot 82. Shield 83 has a web 84 and two downwardly directed side walls 85, 86 and is made of magnetically permeable material. Plate 87 is also made of non-metallic material. Permanent magnet pole piece 88 locates in slot 82 and against plate 87 and is received within coil 89. The coil 89 is received within shield 83.

Shield 90 has a web 91 and side walls 92, 93 and is made of metal and is magnetically permeable. Plate 94 is made of non-metallic material and coil 95 is received between plate 94 and plate 96. Plate 96 is made of similar material to that from which plate 94 is made and has a slot 97 for receiving a permanent magnet pole piece 98.

In the embodiment of FIG. 7, the pole pieces 88 and 98 are separated from one another by webs 87 and 91.

Figure 8:
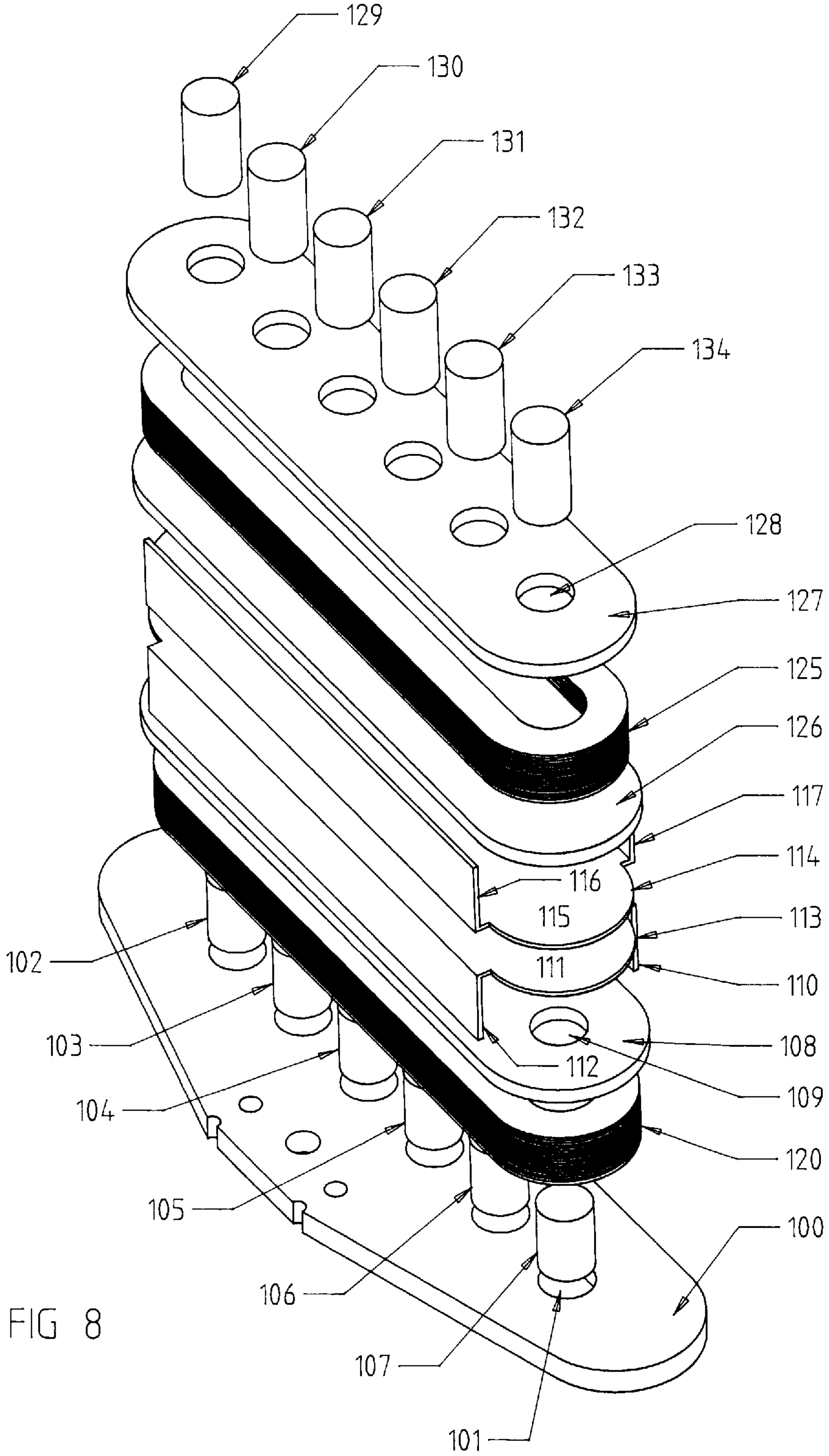
FIG. 8 is an exploded perspective view of a transducer according to an embodiment of the invention.

FIG. 8 shows a construction similar to that of FIG. 7. Base plate 100 is made of non-metallic material and has a plurality of holes 101 for receiving permanent magnet pole pieces 102, 103, 104, 105, 106, 107. These pole pieces extend between plate 108 and plate 100. Plate 108 is constructed from the same material as plate 100 and has a plurality of holes 109 for receiving pole pieces 102 to 107.

Shield 110 has a web 111 and two side walls 112, 113. Shield 114 has a web 115 and two side walls 116, 117. Shields 110 and 114 are made from magnetically permeable material.

Coil 120 is located within shield 110 and pole pieces 102 to 107 are received within the coil.

Coil 125 is received within shield 114 and between plates 126 and 127. These plates are made of a non metallic material and have a plurality of holes 128. Permanent magnet pole pieces 129, 130, 131, 132, 133, 134 are received within apertures 128 and within the coil 125.

Figure 9:
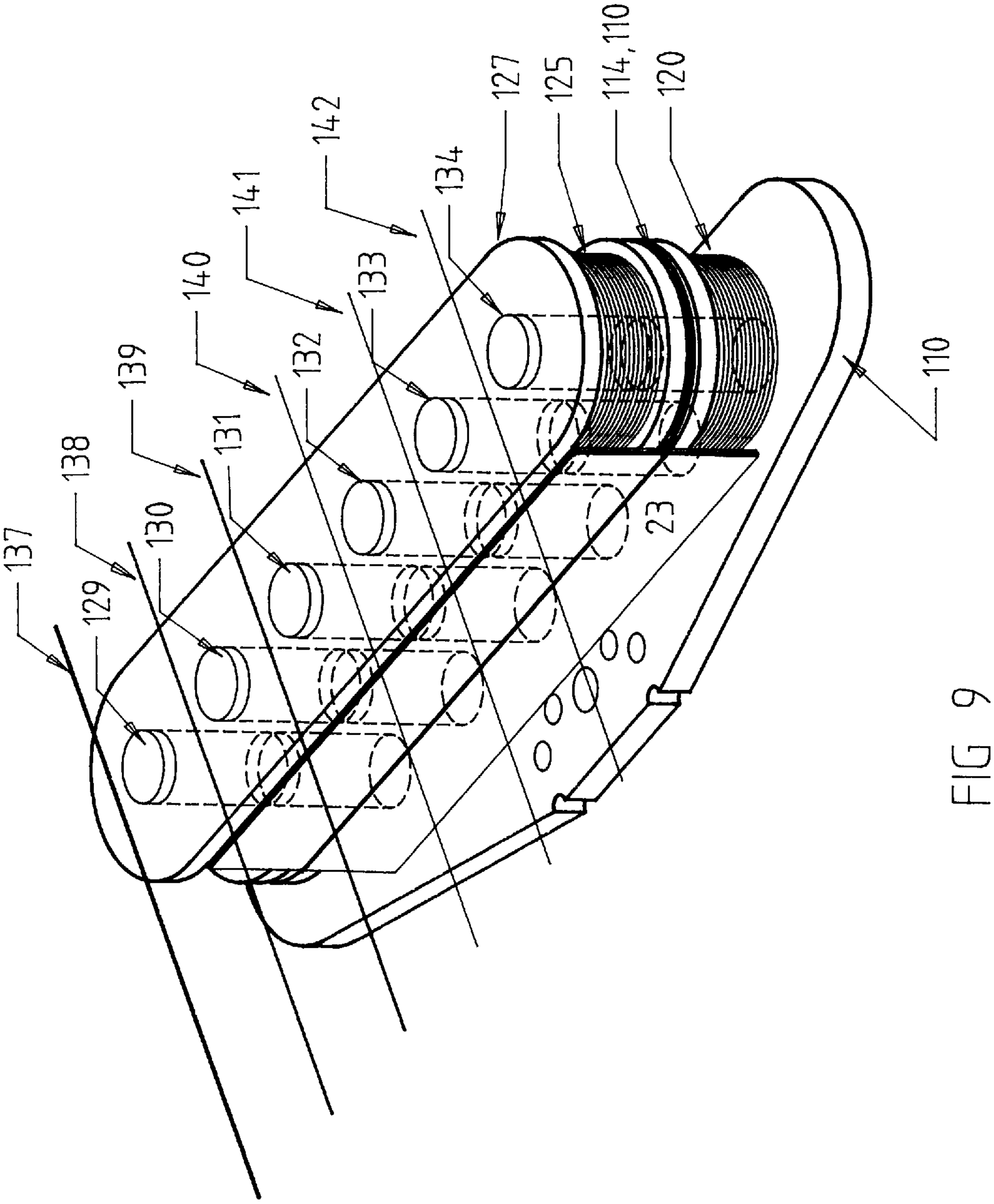
FIG. 9 is an assembled perspective view of the transducer of FIG. 8.

FIG. 9 shows an assembled view of the transducer of FIG. 8. Strings 137, 138, 139, 140, 141 and 142 extend over pole pieces 129 to 134.

Figure 10:
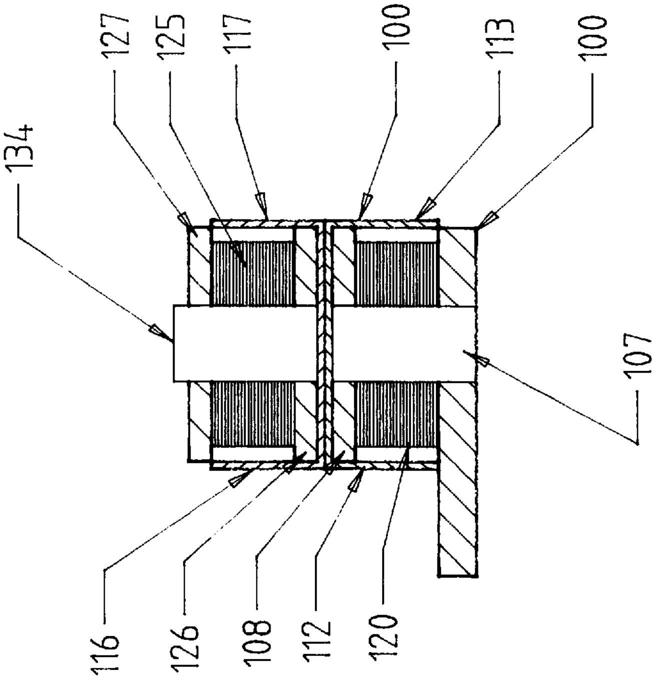
FIG. 10 is a transverse sectional view of the transducer of FIG. 9.

FIG. 10 shows a transverse sectional view through the transducer of FIG. 8. This figure shows how pole piece 107 locates in apertures in plates 100 and 108 and extends through coil 120. Likewise, pole piece 134 extends through plate 127 and through coil 125 into plate 126.

Figure 11:
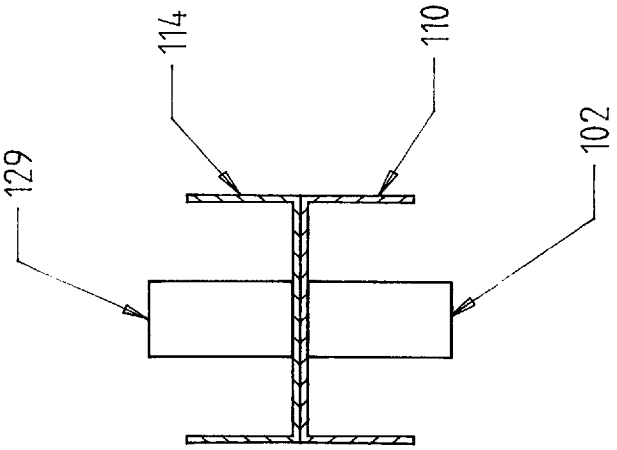
FIG. 11 is a transverse sectional view of part of the transducer of FIG. 9.
Figure 12:
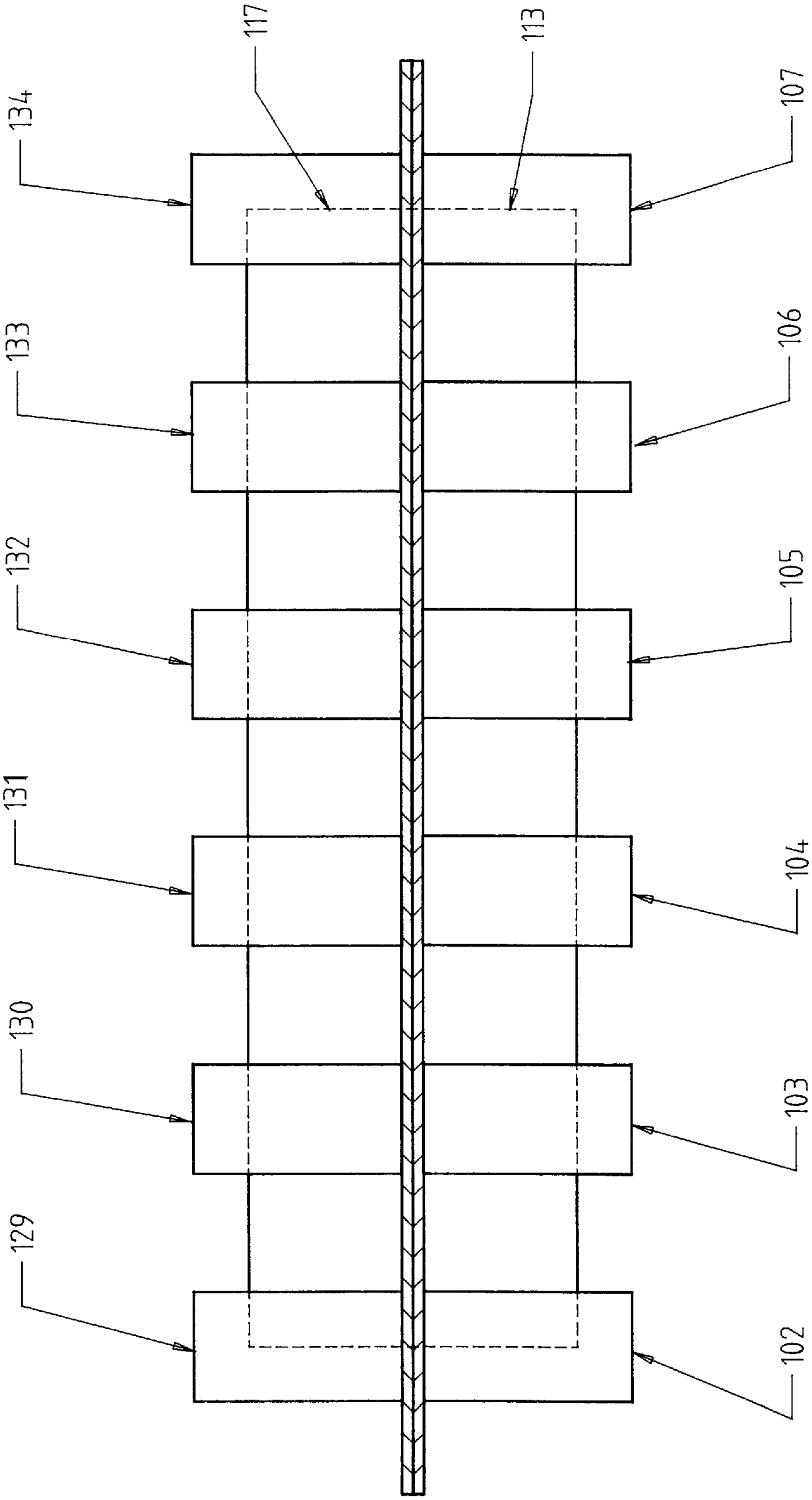
FIG. 12 is a sectional elevational view of that part of the transducer of FIG. 11.

FIGS. 11 and 12 show how the walls of the shields extend along the pole pieces 129 to 134 and 102 to 107 within the two coils of the transducer. These walls terminal partway along the outermost pole pieces.

The embodiments of the transducer of FIGS. 1 to 6 function to not only reduce noise or hum but have higher magnetic strength pole pieces because they are longer as they are common to both coils. These embodiments allow a "vintage" sound to be achieved. The high magnetic strength achievable by these configurations, typically 1200 gauss when employing ALNICO V as the material from which the pole pieces are made cause the strings of the instrument to be attracted into a downward U shaped path resulting in the oscillating strings crashing into the frets of the guitar.

The embodiments of the transducer of FIGS. 7 to 12 allow two coils which are identical with respect to inductance, core material, wire gauge, number of turns and other features to be produced. This mirroring of the coils provides for substantially identical resonant peaks in each coil which allows an overall high Q factor to be obtained for the transducer as a whole. The magnetic polarity of the pole pieces, may be opposed or identical, thus, the adjacent poles may be south/south or south/north. The coils may have between 1000 to 7000 turns but preferably each have about 5000 turns.

Both the embodiments of FIGS. 1 to 6 and 7 to 12 provide coils with a high Q factor which is desirable.

The FIG. 1 to 6 embodiments have a high magnetic strength whereas the FIG. 7 to 12 embodiments have a lower magnetic strength. The presence of the shields magnetically and inductively decouples the coils.

I claim:

1. A transducer having a first coil, a second coil adjacent the first coil, a metallic shield made of magnetically permeable material arranged between the coils, the shield having one or more outwardly directed walls with the wall or walls of the shield extending over sides of the coils and at least one permanent magnet pole piece associated with the first and the second coil.

2. The transducer of claim 1 wherein the magnetic pole piece is common to both coils and the shield has an aperture through which the magnetic pole piece extends.

3. The transducer of claim 2 wherein each said coil is received between two non-metallic non-conductive plates, the plates having apertures through which the magnetic pole piece extends.

4. The transducer of claim 3 wherein the pole piece extends through and beyond the apertures in the plates.

5. The transducer of claim 1 wherein a respective said magnetic pole piece is associated with each said coil.

6. The transducer of claim 5 wherein each said coil is received between two non-metallic non-conductive plates.

7. The transducer of claim 1 wherein a plurality of permanent magnet pole piece are associated with the coils.

8. The transducer of claim 7 wherein the plurality of permanent magnet pole pieces are common to both coils and the shield has a plurality of apertures through which the magnetic pole pieces extend.

9. The transducer of claim 8 wherein each said coil is received between respective non-metallic non-conductive plates, the plates having a plurality of apertures through which the magnet pole pieces extend.

10. The transducer of claim 8 wherein the pole pieces extend through and beyond the apertures in the plates.

11. The transducer of claim 7 wherein a respective set of said permanent magnetic pole pieces is associated with each said coil.

12. The transducer of claim 11 wherein each said coil is received between non metallic non-conductive plates positioned between the coils and the shield.

13. The transducer of claim 1 wherein the shield has a web and a continuous upstanding wall.

14. The transducer of claim 13 wherein the shield is provided by two separate U shaped shield members having opposed side walls.

15. The transducer of claim 1 wherein the coils have an equal number of turns.

16. The transducer of claim 1 wherein the coils are both wound from wire having the same gauge.

17. The transducer of claim 1 wherein the coils each have between 1000 to 7000 turns.

18. The transducers of claim 17 wherein the coils have about 5000 turns.

19. The transducer of claim 1 wherein the shield has a web with rounded ends.

* * * * *